United States Patent [19]

Gallei et al.

[11] 4,252,688

[45] Feb. 24, 1981

[54] MANUFACTURE OF BIFUNCTIONAL CATALYSTS FOR THE CONVERSION OF HYDROCARBONS

[75] Inventors: Ewald Gallei, Viernheim; Laszlo Marosi, Ludwigshafen; Matthias Schwarzmann, Limburgerhof; Ernst Lorenz, Wachenheim, all of Fed. Rep. of Germany

[73] Assignee: BASF Aktiengesellschaft, Fed. Rep. of Germany

[21] Appl. No.: 6,526

[22] Filed: Jan. 25, 1979

[30] Foreign Application Priority Data

Feb. 9, 1978 [DE] Fed. Rep. of Germany ....... 2805336

[51] Int. Cl.³ .............................................. B01J 29/12
[52] U.S. Cl. ................................................. 252/455 Z
[58] Field of Search .................................... 252/455 Z

[56] References Cited

U.S. PATENT DOCUMENTS

| | | | |
|---|---|---|---|
| 3,326,818 | 6/1967 | Gladrow et al. | 252/455 Z |
| 3,449,265 | 6/1969 | Gladrow et al. | 252/455 Z |
| 3,507,812 | 4/1970 | Smith et al. | 252/455 Z |
| 3,547,807 | 12/1970 | Hansford | 208/111 |
| 3,687,869 | 8/1972 | Hensley, Jr. | 252/455 Z |
| 4,036,739 | 7/1977 | Ward | 252/455 Z |

OTHER PUBLICATIONS

Chemistry of Crystalline Aluminosilicates-VII Thermal Decomposition Products of $NH_4^+$ Zeolite Y by George E. Kerr, Jo. of Catalysis 15, 200-204 (1969).

*Primary Examiner*—Carl F. Dees
*Attorney, Agent, or Firm*—Keil & Witherspoon

[57] ABSTRACT

A process for the manufacture of a bifunctional catalyst for the conversion of hydrocarbons, which contains a crystalline aluminosilicate of the type of the Y-zeolites as the acidic component and a noble metal as the hydrogenation component. The process constitutes a technologically simple way of manufacturing bifunctional zeolite catalysts which have at least the same activity and the same life as the catalysts manufactured by conventional methods, coupled with great heat stability and exhibit activity in the presence of $H_2O$, $H_2S$ and $NH_3$ at relatively high temperatures.

5 Claims, No Drawings

MANUFACTURE OF BIFUNCTIONAL CATALYSTS FOR THE CONVERSION OF HYDROCARBONS

The present invention relates to a process for the manufacture of a bifunctional catalyst for the conversion of hydrocarbons, which contains a crystalline aluminosilicate of the type of the Y-zeolites as the acidic component and a noble metal as the hydrogenation component.

German Pat. No. 1,256,824, column 6 and 7, discloses the manufacture of bifunctional zeolite catalysts by starting from a Y-zeolite of the general formula $0.9 \pm 0.2$ $Na_2O \cdot Al_2O_3 \cdot n\, SiO_2 \cdot xH_2O$, where n is a number from 3 to 6 and x is any number up to about 10. The original sodium content is lowered by 90% by subsequent ion exchange of the alkali metal cations for ammonium cations. The decationized form is obtained by heating at 475°–600° C. after the anions have been removed by washing. This decationized form can subsequently again be subjected to exchange for ammonium ions, as described in column 10. After removal of the anions, the hydrogenation component can be introduced. The zeolite can be subjected to a further heat treatment before it is mixed with a binder, which is also charged with the hydrogenation component, and the mixture is extruded.

This process of manufacture entails disadvantages which are particularly important in industrial-scale manufacture. For example, several technologically involved filtration and washing processes are required to lower the Na content of the zeolite powders. Furthermore, the industrial-scale calcination of zeolite powders presents difficulties because the calcination of ammonium zeolites can, depending on the calcination conditions, lead to a plurality of products which in some cases are even catalytically inactive.

It is therefore an object of the present invention to develop a technologically simple process for the manufacture of bifunctional zeolite catalysts which have at least the same activity and life as the catalysts manufactured by conventional methods. It is a further object of the invention to manufacture catalysts which have great heat stability and are active in the presence of $H_2O$, $H_2S$ and $NH_3$ at relatively high temperatures.

We have found that novel bifunctional catalysts for the conversion of hydrocarbons, which catalysts contain a crystalline aluminosilicate of the type of the Y-zeolites as the acidic component and a metal of the noble metal group as the hydrogenation component, are obtained by a process wherein the Y-zeolite has a molar ratio $SiO_2/Al_2O_3$ of from 4.8 to 6, the size of the zeolite crystals is from 0.5 to 2 μm, the zeolite powder, before molding, is mixed with 10–50% by weight of an amorphous aluminosilicate, containing 55–85% by weight of $SiO_2$ and 45–15% by weight of $Al_2O_3$, and/or alumina, as the binder, a carboxylic acid being used as a peptizing agent if required, after molding and drying at 100°–150° C. the sodium ions are replaced by ammonium ions by means of an ammonium salt solution until the sodium content is 0.2–0.4% by weight based on Na, after removal of the anions by washing the moldings are subjected to a deep-bed calcination at 570°–700° C., with a rate of heating of about 2° C./min. up to 150° C., after which the moldings are heated very rapidly to 570°–700° C. and kept at this temperature for several hours, the moldings are then cooled in a dry atmosphere and impregnated with a noble metal salt solution, the volume and concentration of which precisely corresponds to the water absorption capacity and the desired noble metal loading, and the laden moldings are then dried and subjected to a heat treatment at from 500° to 600° C. for several hours, under conditions selected so that no further decrease of the lattice constant occurs.

In a particular embodiment, an ammonium sulfate solution of about 20% strength is used for replacement of the sodium ions.

According to the invention, the zeolite powder is mixed with an amorphous additive, for example a binder, this additive being an amorphous aluminosilicate containing from 75 to 55% by weight of $SiO_2$ and from 25 to 55% by weight of $Al_2O_3$, or pure alumina. Other binders, for example bentonite and basic aluminum nitrates, have proved less suitable since the corresponding catalyst moldings possess a lower resistance to water or lower hydrocracking activity. After spray-drying, during which the calcination loss should be $\geq 35\%$, the mixture of zeolite and binder is kneaded, with addition of a strong organic carboxylic acid, for example oxalic acid or formic acid, as the peptizing agent, and is then molded, for example extruded. The catalyst moldings, whilst still dry, are introduced at 120°–150° C. into a column, and the sodium ions are replaced by ammonium ions using an ammonium salt solution, until a sodium content of from 0.1 to 1% by weight is reached. After washing out the excess anions, the extrudates which have been subjected to the exchange treatment are heated for 3 hours at from 570° to 700° C. It is important that the rate of heating should be very slow up to a temperature of 120°–200° C., advantageously about 2° C. per minute. The zeolite extrudates which have been calcined in this way have a lattice constant of from 24.40 to 24.60 Å, preferably from 24.45 to 24.55 Å. This can be achieved by suitable choice of the calcination temperature.

The hydrogenation component can subsequently be applied to the extrudates by impregnation. Advantageously, the volume of noble metal salt solution brought into contact with the extrudates is always such as suffices to fill the pore volume. The concentration of the noble metal solution can be selected so that the desired amount of noble metal is applied to the catalyst. The catalyst moldings charged with noble metal are then again dried and heat-treated. In a preferred embodiment, the heat treatment is carried out first for 12 hours at 150° C. and then for 4 hours at 500°–600° C., the conditions being so chosen that no further decrease in the lattice constant occurs.

EXAMPLE

A series of Y-zeolite with an $SiO_2/Al_2O_3$ molar ratio of 4.8–6 is prepared. In each case, 140 g of one of the zeolites are mixed with 60 g of amorphous aluminosilicate (molar ratio $SiO_2/Al_2O_3 = 2.1:1$), the mixture is brought to a calcination loss of 35% by spray drying and, after kneading, is extruded. After drying for 12 hours at 120° C., the extrudates are treated twice with 2,400 ml, each time, of a 20% strength $(NH_4)_2SO_4$ solution, whereby the sodium content of the extrudates is lowered to 0.2% by weight, expressed as metal and based on the weight of the extrudate. After each $(NH_4)_2SO_4$ treatment, the catalyst extrudates are washed sulfate-free. Thereafter, a deep-bed calcination is carried out, the heating rate being 2° C./min. up to 120° C., but more rapid, eg. 8° C./min., from 120° up to the final temperature of 550°–770° C. After reaching the final temperature, the heat treatment is continued for about 3 hours. The calcined extrudates, having a lattice constant of 24.45 Å, are then impregnated with about 200 ml of an 0.5% strength by weight $Pd(NH_3)_4(NO_3)_2$ solution. The exact volume of the palladium salt solution is identical with the water absorption of the dried extrudates. The Pd-laden catalyst extrudates are then dried and subjected to a further heat treatment at from 500° to 650° C. for 4 hours.

For use in hydrocracking, a catalyst prepared as described in this Example is reduced in a stream of hydrogen (1.2 m³ (S.T.P.) of $H_2$ per liter of catalyst per hour) at 310° C. under a pressure of 120 bar. The catalyst is then brought into contact with a gas oil which contains 1.3% by weight of sulfur and 1,000 ppm of nitrogen. In a preliminary stage, the gas oil is refined to a nitrogen content of 15 ppm and a sulfur content of 3 ppm, before being brought into contact with the zeolite catalyst, which converts it to a gasoline having a final boiling point of up to 185° C. The gasoline thus obtained can be separated into light gasoline (boiling point up to 80° C.) and heavy gasoline (80°–185° C.). The light gasoline is characterized by the octane number, whilst the properties of the heavy gasoline are determined by the content of paraffins, olefins, naphthenes and aromatics (PONA). Table 1 shows the gas oil cracking (conversion into products boiling at up to 185° C., for a particular cracking temperature) as well as the properties of the light gasoline and heavy gasoline, for the catalyst according to the invention and for a conventional catalyst. The Table shows the substantially higher activity of the catalyst according to the invention compared to the conventional catalyst in the presence of $H_2S$ and $NH_3$. In the two cases, the properties of the light gasoline and heavy gasoline are almost identical.

TABLE

| Catalyst | Cracking activity − 185° C. | Octane number light gasoline − 80° C. | PONA heavy gasoline − 185° C. |
|---|---|---|---|
| conventional manufacture (see page 3) | 72% (390° C.) | 84 | 41.5/0/42.5/16 |
| manufacture according to the invention | 74% (376° C.) | 83.5 | 42.4/0/47.5/10 |

We claim:

1. A process for the manufacture of a bifunctional catalyst for the conversion of hydrocarbons, comprising a crystalline aluminosilicate of the type of the Y-zeolites as the acidic component and a metal of the noble metal group as the hydrogenation component, wherein the Y-zeolite has a molar ratio $SiO_2/Al_2O_3$ of from 4.8 to 6, the size of the zeolite crystals is from 0.5 to 2 μm, the zeolite powder, before molding, is mixed with 10–50% by weight of an amorphous aluminosilicate, containing 55–85% by weight of $SiO_2$ and 45–15% by weight of $Al_2O_3$, and/or alumina as the binder, a carboxylic acid being used as a peptizing agent if required, after molding and drying at 100°–150° C. the sodium ions are replaced by ammonium ions by means of an ammonium salt solution until the sodium content is 0.2–0.4% by weight based on Na, after removal of the anions by washing the moldings are subjected to a deep-bed calcination at 570°–770° C., with a rate of heating of about 2° C./min. up to 150° C., after which the moldings are heated very rapidly to 570°–770° C. and kept at this temperature for several hours, the moldings are then cooled in a dry atmosphere and impregnated with a noble metal salt solution, the volume and concentration of which precisely corresponds to the water adsorption capacity and the desired noble metal loading, and the laden moldings are then dried and subjected to a heat treatment at from 500° to 650° C. for several hours, under conditions selected so that no further decrease of the lattice constant occurs.

2. A process as claimed in claim 1, wherein an ammonium sulfate solution of about 20% strength is used for the replacement of the sodium ions.

3. A process as claimed in claim 1, wherein the lattice constant after the deep-bed calcination is 24.40–24.60 Å.

4. A process as claimed in claim 1, wherein the lattice constant is 24.45–24.55 Å.

5. A process as claimed in claim 1, wherein the noble metal salt solution used is a solution of $Pd(NH_3)_4(NO_3)_2$ or $Pd(NO_3)_2$ and the noble metal concentration on the catalyst is from 0.2 to 1% by weight.

* * * * *